United States Patent [19]

Gohara et al.

[11] Patent Number: 5,281,402

[45] Date of Patent: Jan. 25, 1994

[54] COST REDUCTION OF WET FGD SYSTEM WITH A TRAY

[75] Inventors: Wadie F. Gohara; Dennis W. Johnson, both of Barberton; Robert B. Myers, Copley Township, Summit County; Paul J. Williams, Akron, all of Ohio

[73] Assignee: The Babcock & Wilcox Company, New Orleans, La.

[21] Appl. No.: 9,698

[22] Filed: Jan. 27, 1993

[51] Int. Cl.⁵ .................. B01D 47/00; B01J 8/00; C01B 21/00; C01B 17/00
[52] U.S. Cl. .................. 423/210; 423/235; 423/240 R; 423/243.01; 423/243.08
[58] Field of Search ............ 423/243.01, 243.08, 423/243.09, 210, 240 R, 235

[56] References Cited

U.S. PATENT DOCUMENTS

| | | | |
|---|---|---|---|
| 4,152,394 | 5/1979 | Mehta | 423/243.01 |
| 4,263,021 | 4/1981 | Downs et al. | 423/243.01 |
| 5,234,672 | 8/1993 | Ruschoweyh | 423/243.01 |

Primary Examiner—Gregory A. Heller
Attorney, Agent, or Firm—Robert J. Edwards; Michael L. Hoelter

[57] ABSTRACT

A method of saturating and humidifying the incoming flue gas of a flue gas desulfurization process without the need for underspray headers or the like. Initial humidification occurs by passing the incoming flue gas through a continuous liquid curtain of recycled bottoms product falling from an awning over the flue gas inlet. Further saturation and humidification occurs by causing recycled bottoms product to fall or rain from an overhead tray or grid onto the flue gas prior to passing through the tray or grid. In order to accomplish such humidification, there is an unobstructed passageway between the flue gas inlet and the lowermost tray or grid.

9 Claims, 2 Drawing Sheets

COST REDUCTION OF WET FGD SYSTEM WITH A TRAY

FIELD OF THE INVENTION

This invention pertains to wet flue gas desulfurization (FGD) systems incorporating a tray or grid therein and more particularly to saturating and humidifying the incoming flue gas by means other than through underspray headers.

BACKGROUND OF THE INVENTION

To date, all wet flue gas desulfurization systems having a tray or grid therein also incorporate an underspray header or other quencher, presaturator, or gas cooling device that is used to humidify the gas and to prevent the build-up of solids upon the underside of the tray or grid. In the past, it had been believed that the incoming flue gas needed to be sprayed via such an underspray header assembly in order to improve the operation of the FGD scrubber. To accommodate this belief, separate quench sections were added to the scrubber tower. However, after experimentation, it has now come to light that an underspray header in towers incorporating a tray or grid is no longer needed and that a wet scrubber tower without an underspray header operates equivalent to a tower which includes such a device.

Generally, in a wet FGD tower, the bottoms product or reagent slurry is recirculated between the under and over spray headers. Usually, about 10%-40% of the slurry is delivered to the underspray header for the purpose of saturating and humidifying the incoming gas while the remaining 60%-90% or so is delivered to the overspray header for the purpose of pollutant removal.

As previously indicated, the use of an underspray header was thought necessary so as to uniformly humidify the incoming flue gas and so that the flue gas reaching the tray or grid had a known moisture content. This control over the physical and chemical characteristics of the incoming flue gas was believed essential for proper operation of the scrubber tower and for proper chemical reaction above the tray or grid. Also, the underspray header was often used to continuously wash the bottom of the tray or grid so as to prevent any build-up from occurring at what is known as the wet/dry interface. This wet/dry interface is a zone in the system where the incoming dry flue gas mixes with the humidifying liquid. Unfortunately, the inclusion of an underspray header increases the height of the scrubber tower by as much as two feet or more. Such a scrubber tower requires more height and volume thereby consuming more space in a facility in which excess space adds significantly to the cost. Also, such an underspray header assembly increases the cost of constructing the tower since more piping, pumps, valves, nozzles, and the like are required. Additionally, an underspray header increases the cost of operating the tower due to a greater demand for power and energy. Furthermore, underspray headers increase the final elevation of the overspray headers thereby resulting in a proportionate increase in pump power necessary to supply the bottoms product or reagent slurry to the overspray headers.

By eliminating the underspray header, all of the bottoms product is now directed to the overspray header with the rain falling from the tray or grid under the overspray header being used to humidify and saturate the incoming flue gas, a step normally accomplished by the underspray header. Also, the tray evenly distributes the weeping rain across the tower thereby maintaining uniform gas distribution within the tower. Furthermore, the portion of rain from the tray falling upon an awning structure just above the flue gas inlet forms a continuous, generally uniform curtain of liquid across this inlet. This curtain provides the primary means of gas quenching while the awning protects the floor and walls of the flue gas inlet from any backflow of slurry into the inlet.

It is thus an object of the present invention to provide more reagent on top of the tray or grid where the contaminant removal efficiency is greater and more effective. Another object of the present invention is to provide a shorter tower that is less costly to build, furnish, and operate. Yet another object of the invention is to humidify and saturate the incoming flue gas by directing it through a continuous curtain of reagent falling from an awning shielding the inlet flue gas. Another object of the invention is to direct the gas through a continuous flow of rain from the tray or grid. Still another object of the present invention is to prevent any sideways swirl that may arise upon the entrance of the flue gas into the tower. Furthermore, an object of the present invention is to provide a scrubber tower having high removal efficiencies equivalent to those towers which incorporate an underspray header assembly with less liquid recirculation. Still another object of the invention is to prevent build-up from occurring upon the wet/dry interface at the bottom of the tray or grid. These and other objects and advantages of this invention will become obvious upon further investigation.

SUMMARY OF THE INVENTION

What is disclosed is a method of saturation and humidification for a flue gas contaminant removal process that incorporates an upflow scrubber tower having a flue gas inlet without the use of special means under the tray. A sulfur or other pollutant containing flue gas is discharged into this tower and passes upward through at least one tray or grid within the tower. Afterwards, a recycled bottoms product is sprayed onto the flue gas upon passing through this tray or grid. The improvement consists of the steps of quenching the incoming flue gas prior to its passage through the lowermost tray or grid by initially passing this flue gas through a continuous liquid curtain of bottoms product falling from an awning over the flue gas inlet. Afterwards, further humidification of the incoming flue gas, to the point of saturation, occurs prior to its passage through the lowermost tray or grid by causing the recycled bottoms product to fall or rain upon the incoming and evenly distributed flue gas from the overhead tray or grid. Finally, an unobstructed passageway is created between the flue gas inlet and the lowermost tray or grid for better gas distribution so that any underspray header between the flue gas inlet and the lowermost tray or grid becomes unnecessary or is eliminated.

DETAILED DESCRIPTION OF THE INVENTION

Figure 1:
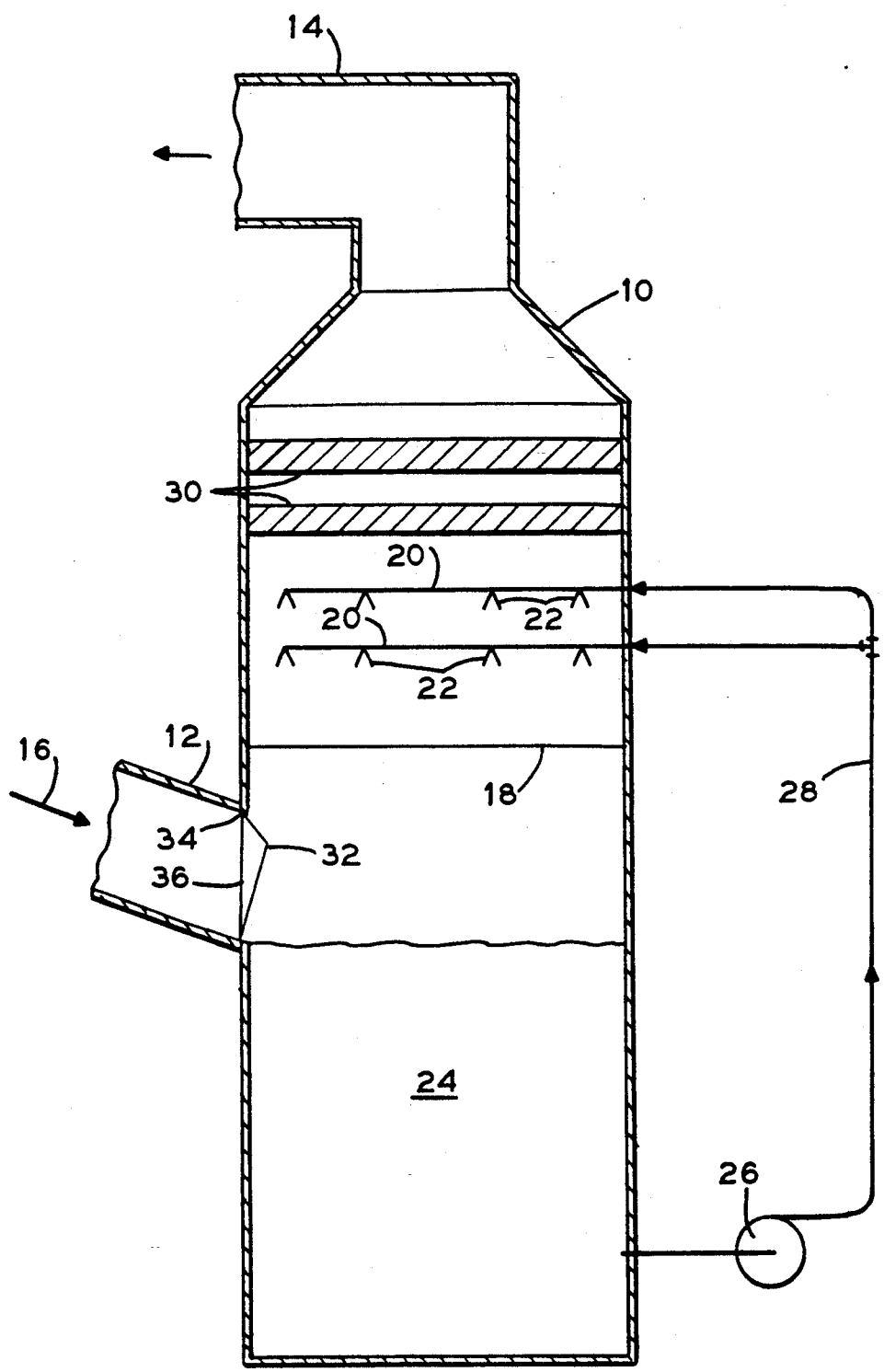
FIG. 1 is a schematic cross-sectional view of a typical scrubber tower without an underspray assembly therein.

Referring to FIG. 1, there is shown scrubber tower 10, having a flue gas inlet 12 and a flue gas outlet 14, through which flue gas 16 passes. Within tower 10 is perforated tray or grid 18 positioned underneath overspray header assembly 20. Nozzles 22 within overspray assembly 20 spray a reagent slurry or bottoms product 24 onto the upward flowing flue gas 16. This reagent slurry or bottoms product 24 is shown as being recycled within tower 10 via pump 26 and recycle line 28. Mist eliminators 30 remove any last vestiqe of entrained moisture droplets from flue gas 16 prior to being discharged via outlet 14. An awning 32 over inlet 12 helps initially deflect the incoming flue gas 16 downward for more even flow or distribution through tower 10 and to prevent any slurry reagent 24 from entering flue gas inlet 12.

Figure 2:
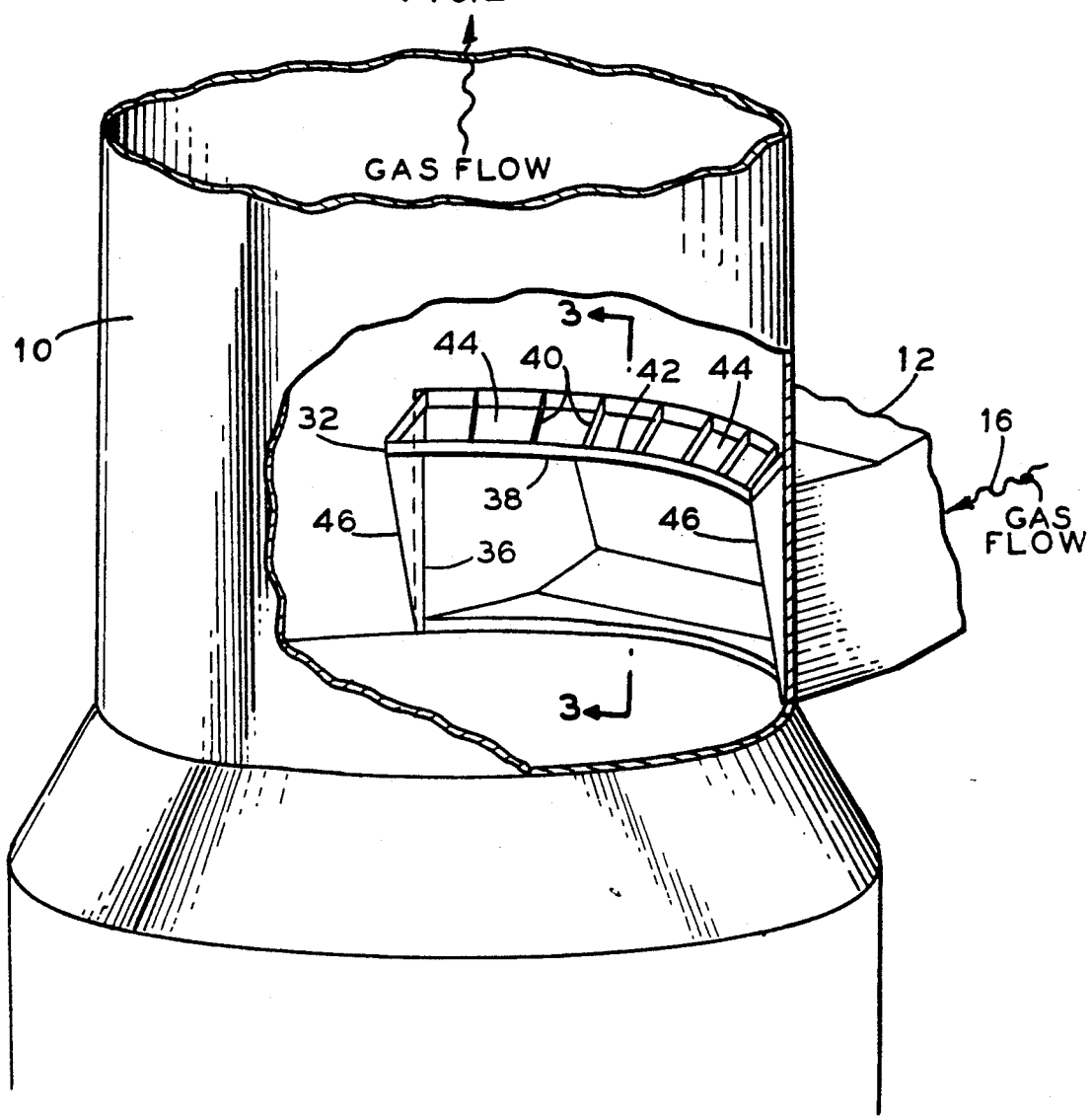
FIG. 2 is a schematic view of the invention, partially cut away, illustrating the awning and related structure.
Figure 3:
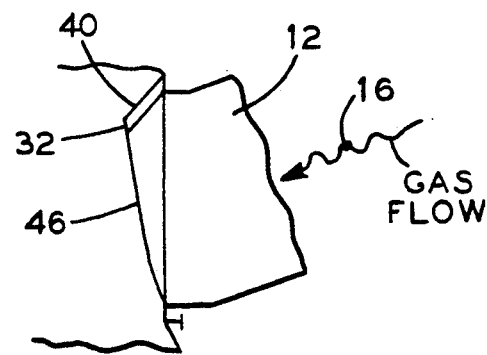
FIG. 3 is a sectional view, taken along lines 3—3 of FIG. 2, illustrating the awning structure in greater detail.

FIGS. 2 and 3 illustrate awning 32 located on top of inlet 12 in greater detail. Awning 32 is generally configured as a flat plate across the top 34 and sides 36 of inlet 12. Top plate 38 of awning 32 is adjustable or can be adjusted (by means not shown) so as to initially force the incoming flue gas 16 downward. The upper surface of top plate 38 is generally compartmented by a plurality of vertical dividers 40 so as to add stiffness to top plate 38 and to evenly distribute the falling slurry 24 across top plate 38. Additionally, an optional collection plate 42 can be used to form a dam at the tip of awning 32 if desired. The collected slurry 24 captured behind collection plate 42 would then either spill over collection plate 42 or leak through a slot or gap between top plate 38 and collection plate 42.

The various compartments or reservoirs 44 in top plate 38, which are formed by dividers 40, fill with reagent slurry 24 falling from tray or grid 18 above. This excess slurry 24 collects behind and pours either over or under (or both) collection plate 42 to thereby form an even curtain of liquid falling in front of inlet 12. This liquid curtain then quenches incoming flue gas 16 as it enters tower 12.

As shown in FIG. 1, there is no underspray header assembly underneath tray 18 or between tray 18 and flue gas inlet 12. Instead, the reagent 24 falling from tray 18 (and that portion of reagent 24 falling upon awning 32) quenches the incoming dry flue gas 16 prior to passage through tray 18. The use of such a weeping tray 18 provides a heavy shower of slurry 24 that performs the function of previous underspray headers. Most of this rain of reagent slurry or bottoms product 24 from tray 18 is evenly distributed across tower 10. The resistance of tray or grid 18 to flue gas 16 flowing upward therethrough helps evenly distribute flue gas 16 within tower 12 and provides an optimum gas-to-liquid ratio for complete saturation and optimum pollutant removal.

A portion of this rain or slurry or bottoms product 24 falling from tray 18 just above inlet 12 falls upon awning 32. Awning 32 and reservoirs 44 distribute the collected slurry 24 as a continuous, uniformly thick, curtain of liquid across inlet 12 thereby quenching and humidifying the incoming flue gas 16 very quickly.

Due to the elimination of underspray headers, the height of tower 10 is reduced a minimum of about two feet on the average thereby requiring a less costly structure. Additionally, the construction of tower 10 is made more efficient since it is now simplified by the elimination of the cutting and welding processes normally required to install an underspray header. Furthermore, the cost of equipping tower 10 is reduced since fewer pumps, piping, nozzles, valves, and the like are now required. Also, all of the recycled slurry 24 is delivered to overspray headers 20 rather than being split between over and under spray headers. This enables more of slurry 24 to be provided to the top of tray 18 where contaminant removal efficiency is greater as a result of contact both in the spray and the resultant froth on tray or grid 18. Finally, awning 32 directs the incoming flue gas 16 initially downward providing a downward swirl effect that intimately mixes the gas 16 and slurry 24.

From tests conducted on such a system, it has been shown that the availability and reliability of wet FGD systems without underspray headers is the same as those with such headers. Such data also shows that the performance or contaminant removal of such systems can be maintained by properly selecting the spray flow characteristics above tray 18. Additionally, there has been no increase or build-up of solids underneath tray 18.

The slurry flow falling from compartments 44 on awning 32 also provides for the quenching and humidifying of flue gas 16 and for even gas distribution within tower 10. Any side-to-side flow of flue gas 16 passing through the liquid curtain formed from the flow of slurry 24 from overspray headers 20 above will be reduced and/or eliminated. Side plates 46 of awning 32 provide resistance to correct any such side-to-side movement.

Alternatively, this improvement can also apply to grid or packed FGD systems that have sufficient liquid with adequate flow distribution above the packing or grid. Also, this improvement can apply to any absorption or quench system that incorporates a tray or gas distribution device with an overspray above. This includes aqueous scrubbers for such gaseous pollutants as HCl, HF, $NO_x$, $SO_2$, $SO_3$, Hg, etc. and certain materials such as flyash.

In the tests performed, (a) the average fuel flow to the burners was 1.02 million pounds of coal per hour; (b) the inlet gas sulfur dioxide ($SO_2$) ranged from 1100 to 2155 parts per million at about 6% oxygen; and, (c) the fuel sulfur content ranged from about 1.99 to 4.00 on a dry basis. During this test, the total boiler full load gas flow averaged 3,772,884 actual cubic feet per minute (ACFM) split between five duplicate absorber towers. The gas velocity ranged from 8.3 to 9.4 feet per second based on the saturated gas volume. As a consequence, the liquid/gas (L/G) ratio for the tower lacking an operating underspray was less than the L/G ratio in the tower incorporating an underspray. Also, there was even skin temperature around inlet 12 which indicated that gas 16 was evenly quenched/humidified from the rain slurry 24 falling from tray 18 and onto awning 32. Follow up pressure drop measurements indicate a pressure profile similar to that found in towers with underspray headers. Thus, it was confirmed that the elimination of the underspray header has no adverse effect on the operation of tower 10. Also, no scaling or deposits were found on the underneath side of tray 18. Additionally, sulfur dioxide removal improved considering the drop in L/G.

In a repeat test, the following operating parameters were controlled: pH was set at 6.2 and total solids was set at about 10%. The gas flow for the follow-up test was determined from the average sulfur content, the inlet sulfur dioxide parts per million, and fuel flow with this gas flow being about 734,221 ACFM through a single absorber tower. Consequently, the saturated gas velocity through tower 10 based on outlet gas conditions was 9.5 ft/sec. The results of this follow-up test indicated similar contaminant removal capabilities despite the failure to utilize underspray headers within tower 10.

What is claimed is:

1. In a method of saturation and humidification for a glue gas decontamination process incorporating an upflow scrubber tower, having a flue gas inlet into which a flue gas contaminated with, optionally, nitrogen oxides, sulfur oxides, HCl, HF, Hg or flyash is discharged, this flue gas passing through at least one tray or grid within the tower while a recycled bottoms product or reagent slurry is sprayed onto the flue gas after it passes upward through the tray or grid, wherein the improvement comprises:

(a) initially saturating and humidifying the incoming flue gas upon entrance into the tower by passing the flue gas through a continuous liquid curtain of bottoms product or reagent slurry falling from an awning over the flue gas inlet:

(b) further humidifying the incoming flue gas prior to passage through the lowermost tray or grid by causing the recycled bottoms product or reagent slurry to form a uniform liquid layer on top of the tray or grid and to fall as rain upon the incoming flue gas from the overhead tray or grid;

(c) evenly distributing the flue gas within the tower underneath the tray or grid by the resistance created by said uniform liquid layer on top of the tray or grid and by the tray or grid itself;

(d) providing an even liquid/gas ratio across the cross-sectional area of the tray or grid complete saturation and uniform pollutant removal; and, (e) creating an unobstructed passageway between the flue gas inlet and the lowermost tray or grid whereby an underspray header between the flue gas inlet and the lowermost tray or grid is eliminated.

2. The method of saturation and humidification as set forth in claim 1 further comprising the step of evenly distributing the fall or rain of the recycled bottoms product or reagent slurry across the tower.

3. The method of saturation and humidification as set forth in claim 2 further comprising the step of delivering all or nearly all of the recycled bottoms product or reagent slurry to a location above the tray or grid thereby enhancing contaminant removal.

4. The method of saturation and humidification as set forth in claim 3 further comprising the step of restricting and/or eliminating any undesirable flow patterns within the tower, including side to side maldistribution, by initially directing the flue gas through said continuous liquid curtain.

5. The method of saturation and humidification as set forth in claim 4 further comprising the step of compartmentalizing said awning into separate reservoirs that collect the bottoms product or reagent slurry therein prior to falling or flowing across the gas inlet as said continuous liquid curtain.

6. The method of saturation and humidification as set forth in claim 5 further comprising the step of causing said continuous liquid curtain of bottoms product or reagent slurry falling from said awning to have a generally uniform thickness and to provide resistance to the incoming flue gas.

7. The method of saturation and humidification as set forth in claim 6 further comprising the step of reducing and/or eliminating deposit build-up upon the underneath side of the lowermost tray or grid.

8. The method of saturation and humidification as set forth in claim 7 further comprising the step of adjusting said awning so as to initially direct the incoming flue gas downward thereby forming a swirl that intimately mixes the flue gas and the recycled bottoms product or reagent slurry falling from the overhead tray or grid.

9. The method of saturation and humidification as set forth in claim 8 further comprising the step of adjusting said awning so that the web/dry interface is located generally in the middle of the scrubber tower rather than along or near the walls of the tower thereby avoiding the information of deposits on the walls and floor of the flue gas inlet.

* * * * *

UNITED STATES PATENT AND TRADEMARK OFFICE
CERTIFICATE OF CORRECTION

PATENT NO. : 5,281,402
DATED : Jan. 25, 1994
INVENTOR(S) : Wadie F. Gohara, Dennis W. Johnson, Robert B. Myers, and Paul J. Williams It is certified that error appears in the above-identified patent and that said Letters Patent is hereby corrected as shown below:

Column 5, line 35, after "grid", please insert --for--.

Column 6, line 38, please delete "web" and insert therefor --wet--.

Column 6, line 41, please delete "information" and insert therefor --formation--.

Signed and Sealed this

Second Day of August, 1994

*Attest:*

BRUCE LEHMAN

*Attesting Officer*     *Commissioner of Patents and Trademarks*